United States Patent
Kim et al.

(10) Patent No.: US 10,954,111 B2
(45) Date of Patent: Mar. 23, 2021

(54) FORKLIFT SYSTEM AND CONTROL METHOD THEREOF

(71) Applicants: HYUNDAI MOTOR COMPANY, Seoul (KR); KIA MOTORS CORPORATION, Seoul (KR)

(72) Inventors: Euihyun Kim, Seoul (KR); Jae Ho Choi, Anyang-si (KR); Jung Su Gong, Anyang-si (KR); Jung Whan Yeum, Seoul (KR); Sangduck Han, Anyang-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/990,253

(22) Filed: Aug. 11, 2020

(65) Prior Publication Data
US 2020/0369499 A1 Nov. 26, 2020

Related U.S. Application Data

(62) Division of application No. 15/829,365, filed on Dec. 1, 2017, now Pat. No. 10,773,938.

(30) Foreign Application Priority Data

Apr. 28, 2017 (KR) .................. 10-2017-0055050

(51) Int. Cl.
*B66F 9/075* (2006.01)
*G05D 1/02* (2020.01)
(Continued)

(52) U.S. Cl.
CPC ............ *B66F 9/0755* (2013.01); *B66F 9/063* (2013.01); *B66F 9/24* (2013.01); *G05D 1/0088* (2013.01);
(Continued)

(58) Field of Classification Search
CPC ...... B66F 9/0755; B66F 9/063; B66F 17/003; B66F 9/144; B66F 9/142; B66F 9/143;
(Continued)

(56) References Cited

U.S. PATENT DOCUMENTS 5,052,882 A * 10/1991 Blau ................... B66F 9/063
414/667
9,561,941 B1 2/2017 Watts
(Continued)

FOREIGN PATENT DOCUMENTS

| CN | 102874193 A | 1/2013 |
| CN | 105480903 A | 4/2016 |

(Continued)

*Primary Examiner* — Kenneth J Malkowski
(74) *Attorney, Agent, or Firm* — McDonnell Boehnen Hulbert & Berghoff LLP

(57) ABSTRACT

An exemplary embodiment of the present disclosure provides a forklift system. The system includes a vehicle body of a forklift; a fork configured to be vertically movable at one side of the vehicle body; a sensor unit; and a control unit. The sensor unit is configured to be disposed at a front end portion of the fork to detect an external object. The control unit is configured to control movement of the vehicle body or the position of the fork according to a detection signal generated by the sensor unit.

4 Claims, 7 Drawing Sheets

(51) Int. Cl.
*G05D 1/00* (2006.01)
*B66F 9/06* (2006.01)
*B66F 9/24* (2006.01)

(52) U.S. Cl.
CPC ........... *G05D 1/024* (2013.01); *G05D 1/0225* (2013.01); *G05D 1/0227* (2013.01); *G05D 2201/0216* (2013.01)

(58) Field of Classification Search
CPC ......... G05D 2201/0216; G05D 1/0225; G05D 1/0231
See application file for complete search history.

(56) References Cited

U.S. PATENT DOCUMENTS

| | | |
|---|---|---|
| 2004/0083025 A1 | 4/2004 | Yamanouchi et al. |
| 2009/0271058 A1 | 10/2009 | Chilson |
| 2012/0191272 A1 | 7/2012 | Andersen et al. |
| 2012/0211308 A1 | 8/2012 | Issartel |
| 2013/0124014 A1 | 5/2013 | Elston et al. |
| 2015/0368081 A1 | 12/2015 | Van Seumeren |
| 2018/0120465 A1* | 5/2018 | Rose ........................ B66F 9/063 |
| 2020/0031642 A1* | 1/2020 | Uchimura .............. G05D 1/024 |

FOREIGN PATENT DOCUMENTS

| | | |
|---|---|---|
| CN | 205575486 U | 9/2016 |
| JP | H07-215695 A | 8/1995 |
| KR | 10-2010-0108776 A | 10/2010 |
| KR | 10-2013-0099596 A | 9/2013 |

* cited by examiner

FORKLIFT SYSTEM AND CONTROL METHOD THEREOF

CROSS REFERENCE TO RELATED APPLICATIONS

This application is a divisional of U.S. application Ser. No. 15/829,365 filed on Dec. 1, 2017, which claims priority to and the benefit of Korean Patent Application No. 10-2017-0055050 filed in the Korean Intellectual Property Office on Apr. 28, 2017, the entire contents of each of these applications are incorporated herein by reference.

BACKGROUND

(a) Field of the Disclosure

The present disclosure relates to a forklift system and a control method thereof that may allow a fork of the forklift to be accurately inserted into a pallet.

(b) Description of the Related Art

Generally, a pallet for supporting freight is widely used when the freight is transported by a forklift.

However, when the freight is transported by a forklift, an accident due to an operation error of a forklift driver may occur. Recently, for solving such a problem, reducing manpower, and improving productivity and the working environment, an autonomously guided vehicle has been under development.

However, since a conventional autonomously guided vehicle operates under an assumption that the pallet is in a set position and posture, when the position and posture of the pallet deviate from the set position and posture, it may not operate. In addition, although a method of identifying characteristic information of the pallet is being developed as a working method for an autonomously guided vehicle taking into consideration change of the position and posture of the pallet, there may be limitations in identifying the characteristic information of the pallet according to the environment of a workplace.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide a forklift system and a control method thereof that may allow a fork of the forklift to be accurately inserted into a center of an insertion hole when the fork is inserted into the insertion hole of the pallet.

An exemplary embodiment of the present disclosure provides a forklift system including: a fork configured to be vertically movable at one side of the vehicle body; a sensor unit configured to be disposed at a front end portion of the fork to detect an external object; and a control unit configured to control movement of the vehicle body or a position of the fork according to a detection signal generated by the sensor unit.

The sensor unit may include: a sensor body configured to be fixed to the front end portion of the fork; a contact sensor configured to contact a front object and provided at the sensor body to detect an external object; and a non-contact sensor configured to be provided at the sensor body and to emit a signal upon detecting an external object.

The contact sensor may include: a contact portion configured to contact the external object; and a contact sensor configured to be connected to the contact portion.

The forklift system may further include an elastic member configured to be interposed between the contact portion and the contact sensor.

The non-contact sensor may be a photosensor that detects a front object through a detection path formed in the contact portion.

The contact portion may include a left contact portion and a right contact portion that are respectively formed at left and right sides of the sensor unit with respect to a center of the fork, and the contact sensor may include a left contact sensor corresponding to the left contact portion and a right contact sensor corresponding to the right contact portion.

The control unit may move the vehicle body backward when the non-contact sensor emits a signal upon detecting an external object.

The control portion may rotate the vehicle body rightward by a predetermined angle when the left contact portion of the contact sensor generates a signal.

The control portion may rotate the vehicle body leftward by a predetermined angle when the right contact portion of the contact sensor generates a signal.

The forklift system may further include: a navigation sensor configured to be provided at one side of the vehicle body to detect a position of the vehicle body; and a laser sensor configured to be disposed between a pair of forks to detect a position of the pallet to which the forks are fastened.

Another embodiment of the present disclosure provides a fork sensor unit disposed at a front end portion of a fork for detecting an external object, the fork sensor unit including: a sensor body configured to be fixed to the front end portion of the fork; a contact sensor configured to contact a front object and provided at the sensor body to detect an external object; and a non-contact sensor configured to be provided at the sensor body and to emit light to the outside upon detecting an external object.

The contact sensor may further include a contact portion configured to contact the external object; and a contact sensor configured to be connected to the contact portion.

The fork sensor unit may further include an elastic member configured to be interposed between the contact portion and the contact sensor.

The non-contact sensor may be a photosensor that detects a front object by using a wavelength emitted in front of the fork through a detection path formed in the contact portion.

The contact portion may include left and right contact portions respectively formed at left and right sides with respect to a center of the fork. The contact sensor may include left and right contact sensors corresponding to the left and right contact portions, respectively.

Yet another embodiment of the present disclosure provides a control method of a forklift, the forklift having two forks, the method including: detecting a shape of and a distance to a target pallet by using a laser sensor; approaching a vehicle body to the pallet; detecting an angle ($\theta$) between a pallet center line of the pallet and a vehicle body center line of the vehicle body; and controlling a position of the vehicle body so that the angle ($\theta$) is within a predetermined numerical value.

The control method of the forklift may further include: detecting an angle ($\theta'$) between a front surface line of the pallet and a front end line of the fork; and controlling a position of the vehicle body so that the angle (θ') is within a predetermined numerical value.

The control method of the forklift may further include: measuring a distance between fork insertion holes formed in the pallet by using the laser the laser sensor; and adjusting a distance between the forks according to the distance between the fork insertion holes.

The control method of the forklift may further include moving the vehicle body so that the forks are inserted into the fork insertion holes formed in the pallet.

The control method of the forklift may further include detecting a signal generated by a sensor unit provided at a front end of the fork of the forklift; and controlling movement of the forklift by using the signal.

The control method of the forklift may further include, when a non-contact sensor provided at the sensor unit generates a signal upon detecting an external object, the vehicle body is moved backward, and when a contact sensor provided at the sensor unit generates a signal upon contacting a front object to detect an external object, the vehicle body is rotated rightward or leftward by a predetermined angle.

DETAILED DESCRIPTION

Hereinafter, an exemplary embodiment of the present disclosure will be described in detail with reference to the accompanying drawings.

Figure 1:
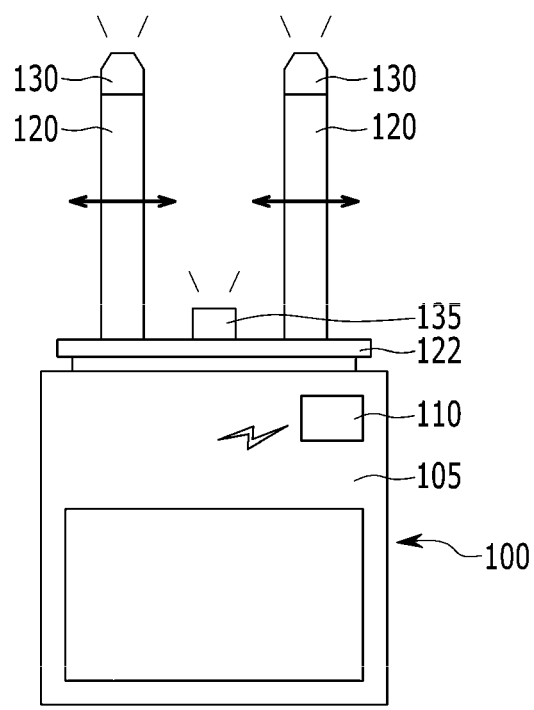
FIG. 1 illustrates a top plan view of an autonomously guided forklift including a fork sensor unit according to an exemplary embodiment of the present disclosure.

FIG. 1 illustrates a top plan view of an autonomously guided forklift including a fork sensor unit according to an exemplary embodiment of the present disclosure.

Referring to FIG. 1, an autonomously guided forklift 100 includes a vehicle body 105, a vertical moving member 122, a fork 120, a navigation sensor 110, a laser sensor 135, and a sensor unit 130.

The navigation sensor 110 is disposed at one upper side of the vehicle body 105 and detects a position of the autonomously guided forklift 100.

The vertical moving member 122 is disposed in front of the vehicle body 105, and a pair of forks 120 is horizontally disposed in front of the vertical moving member 122. The sensor unit 130 is provided at a front end of each of the forks 120.

The laser sensor 135 is disposed at the vertical moving member 122 between the forks 120, and it may detect a shape and a position of an object such as a front of a pallet.

Figure 2:
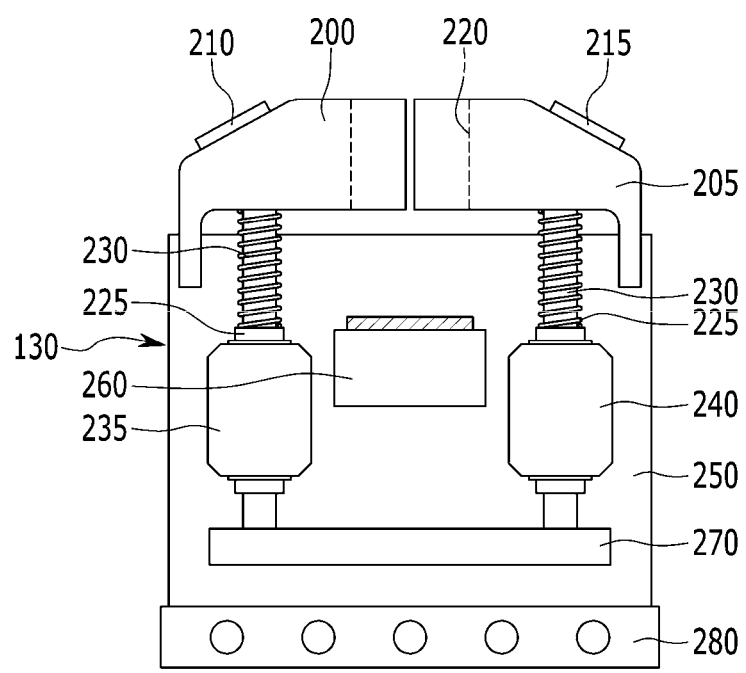
FIG. 2 illustrates a top plan view of the inside of a fork sensor unit according to an exemplary embodiment of the present disclosure.

Referring to FIG. 2, a detailed structure of the fork sensor unit 130 will be described.

FIG. 2 illustrates a top plan view of the inside of a fork sensor unit according to an exemplary embodiment of the present disclosure.

Referring to FIG. 2, the sensor unit 130 includes, as constituent elements, a left contact portion 200, a left contact surface 210, a detection path 220, a right contact surface 215, a right contact portion 205, an elastic member 225, a connection rod 230, a right contact sensor 240, a sensor body 250, a photosensor 260, a supporting member 270, a sensor bracket 280, and a left contact sensor 235.

The sensor bracket 280 is fixed to a rear end of the sensor body 250, and the sensor body 250 is mounted on a front end portion of the fork 120 through the sensor bracket 280.

The supporting member 270 is fixed in front of the sensor bracket 280, and the left contact sensor 235 and the right contact sensor 240 are disposed in front of the supporting member 270. The left contact sensor 235 and the right contact sensor 240 are supported by the supporting member 270.

The left contact portion 200 is disposed in front of the left contact sensor 235, the connection rod 230 is disposed between the left contact sensor 235 and the left contact portion 200, and the elastic member 225 is disposed along the connection rod 230.

When the left contact portion 200 comes into contact with an obstacle or a pallet, the elastic member 225 is compressed and the compression force is transmitted to the left contact sensor 235 through the connection rod 230.

The right contact portion 205 is disposed in front of the right contact sensor 240, the connection rod 230 is disposed between the right contact sensor 240 and the right contact portion 205, and the elastic member 225 is disposed along the connection rod 230. The elastic member 225 is a type of coil spring, and the connection rod 230 passes through a center of the coil spring.

When the right contact portion 205 comes into contact with an obstacle or a pallet, the elastic member 225 is compressed and the compression force is transmitted to the right contact sensor 240.

An inclined right contact surface 215 is formed at an edge of the right contact portion 205, and an inclined left contact surface 210 is formed at an edge of the left contact portion 200.

Figure 3:
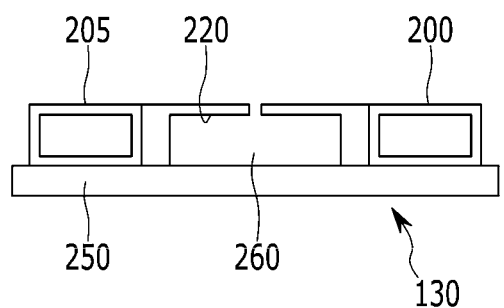
FIG. 3 illustrates a front view of a fork sensor unit according to an exemplary embodiment of the present disclosure.

FIG. 3 illustrates a front view of a fork sensor unit 130 according to an exemplary embodiment of the present disclosure.

Referring to FIG. 3, the detection path 220 is formed in front of the photosensor 260 through the left contact portion 200 and the right contact portion 205, which are disposed in front of the photosensor 260. In addition, the photosensor 260 is disposed between the left contact sensor 235 and the right contact sensor 240, and the photosensor 260 photographs a front thereof through the detection path 220.

Figure 4:
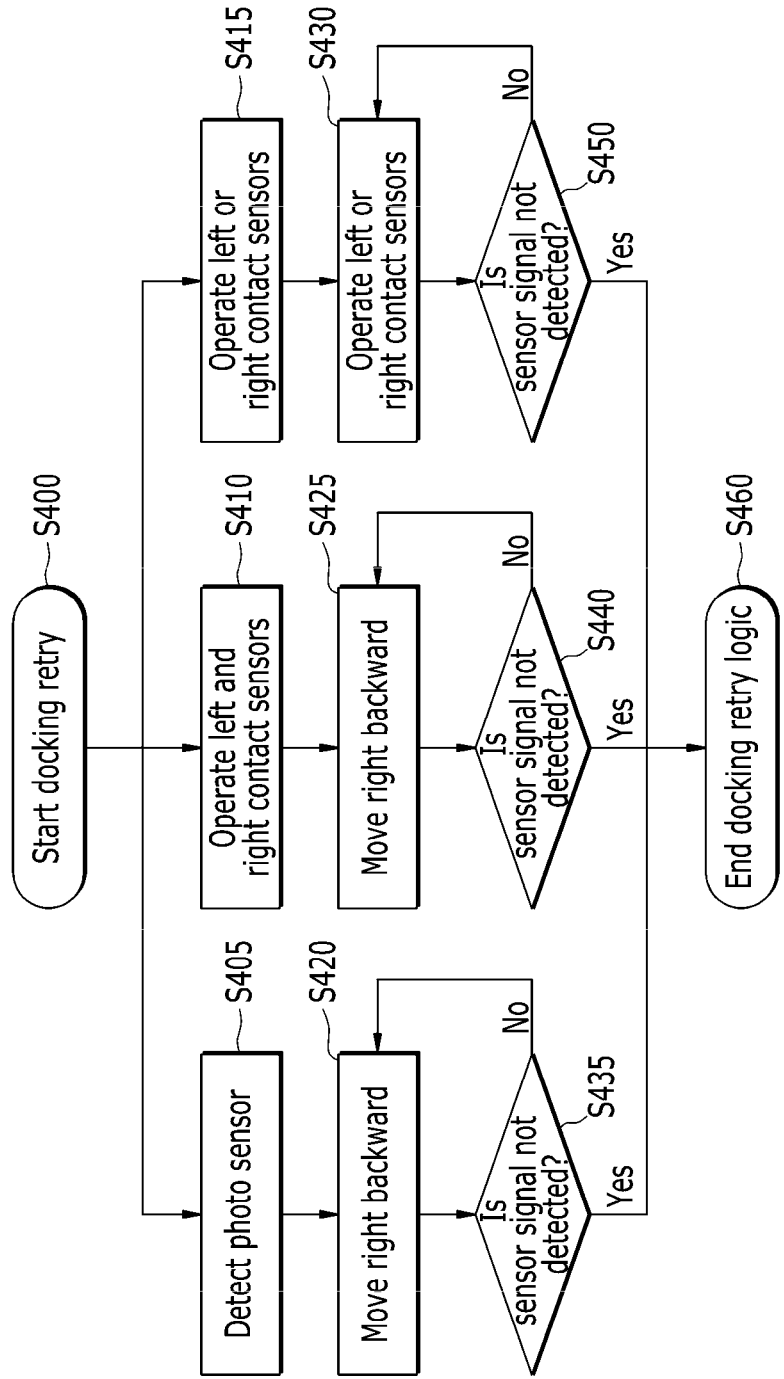
FIG. 4 illustrates a flowchart of a method executed by a control system of an autonomously guided forklift including a fork sensor unit according to an exemplary embodiment of the present disclosure.

FIG. 4 illustrates a flowchart of a method executed by a control system of an autonomously guided forklift including a fork sensor unit according to an exemplary embodiment of the present disclosure.

Referring to FIG. 4, docking retry logic starts at step S400. Here, the docking may mean that the fork 120 enters into a fork insertion hole (not shown) of the pallet (not shown), and the docking retry logic may be logic to attempt insertion of the fork 120 into the fork insertion hole of the pallet.

When the photosensor 260 of the fork 120 generates a sensing signal (S405), a control unit 500 moves the vehicle body 105 right backward (S420). When the photosensor 260 of the fork 120 does not generate a sensing signal (S435), step S460 is performed. The docking retry logic is ended at step S460.

When the left contact sensor 235 and the right contact sensor 240 of the fork 120 generate detection signals (S410), the control unit 500 moves the vehicle body 105 right backward (S425). When the left contact sensor 235 and the right contact sensor 240 of the fork 120 do not generate detection signals (S440), step S460 is performed.

When the left contact sensor 235 or the right contact sensor 240 of the fork 120 generates a detection signal (S415), the control unit 500 rotates the vehicle body 105 in a right or left direction (S430). When the left contact sensor 235 and the right contact sensor 240 of the fork 120 do not generate a detection signal (S450), step S460 is performed.

Figure 5:
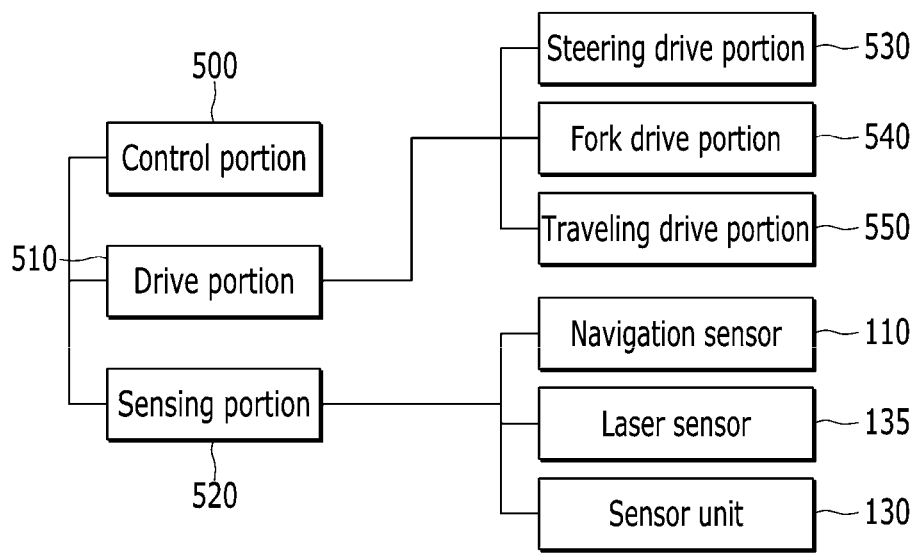
FIG. 5 illustrates a schematic view of a control system of an autonomously guided forklift including a fork sensor unit according to an exemplary embodiment of the present disclosure.

FIG. 5 illustrates a schematic view of a control system of an autonomously guided forklift including a fork sensor unit according to an exemplary embodiment of the present disclosure.

Referring to FIG. 5, a control system of an autonomously guided forklift includes the control unit 500, a drive unit 510, and a sensing unit 520, and the drive unit 510 includes a steering drive unit 530, a fork drive unit 540, and a traveling drive unit 550.

The steering drive unit 530 may control a moving direction and rotation of the vehicle body 105, and the fork drive unit 540 may control a distance between, and vertical heights and longitudinal angles of, the forks 120. Herein, since a steering device, a fork operating device, and a drive device are well known in the art, a detailed description thereof will be omitted.

The control unit 500 may be implemented by one or more processors operated by a predetermined program, and the predetermined program may include a series of commands for performing a method according to an exemplary embodiment of the present disclosure.

The sensing unit 520 includes the navigation sensor 110, the laser sensor 135, and the sensor unit 130, and the control unit 500 may control constituent elements of the drive unit 510 by using signals sensed by constituent elements of the sensing unit 520.

In the exemplary embodiment of the present disclosure, the photosensor may be a non-contact sensor that may emit light forward or photograph a forward object, and the left contact sensor and the right contact sensor may be contact sensors.

Figure 6:
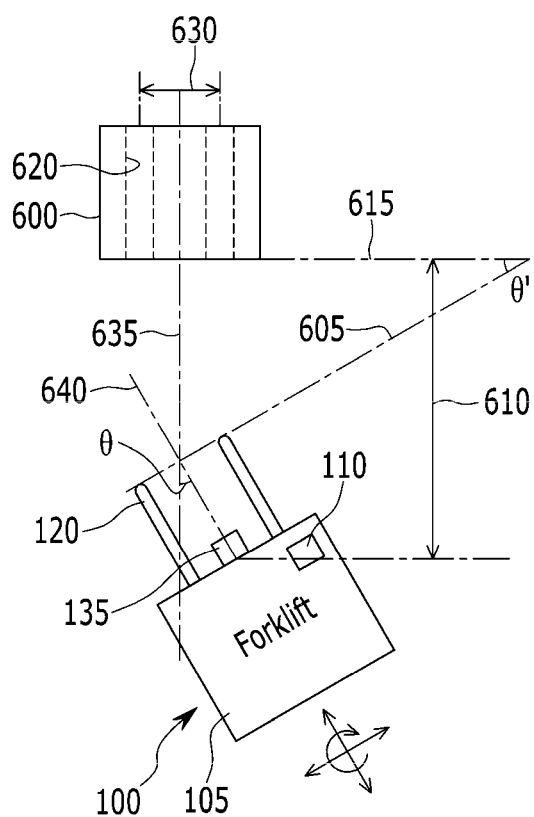
FIG. 6 is a schematic top plan view for showing control factors between an autonomously guided forklift and a pallet according to an exemplary embodiment of the present disclosure.

FIG. 6 is a schematic top plan view for showing control factors between an autonomously guided forklift and a pallet according to an exemplary embodiment of the present disclosure. While comparing with the exemplary embodiments of FIGS. 1 to 5, characteristic differences will be described.

Referring to FIG. 6, a fork front end connecting line 605 connecting a front end of the fork 120 is shown, and a pallet front surface line 615 is shown along a front surface of a pallet 600.

The control unit 500 detects an angle (θ') formed between the lines 605 and 615, and it may control movement of the vehicle body 105 so that the angle is included within a predetermined set value.

In addition, a pallet center line 635 of the pallet 600 and a vehicle body center line 640 of the autonomously guided forklift 100 are shown.

The control unit 500 detects an angle (θ) formed between the pallet center line 635 and the vehicle body center line 640, and it may control movement of the vehicle body 105 so that the angle is included within a predetermined set value.

The control unit 500 may detect a distance 610 and a shape of the pallet 600 positioned in front thereof through the laser sensor 135, may control movement of the vehicle body 105 in approaching the pallet 600, and then may control movements of the vehicle body 105 and the fork 120 so that the fork 120 may be inserted into a fork insertion hole 620 formed in the pallet 600.

Figure 7:
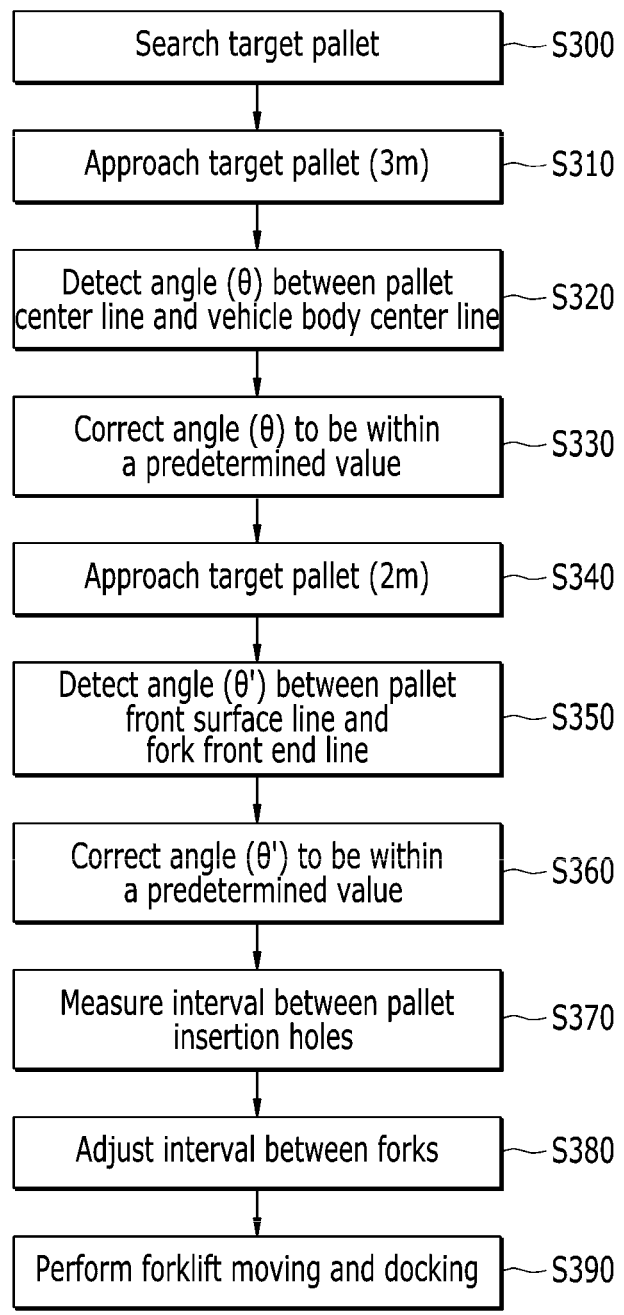
FIG. 7 illustrates a flowchart of a control method of an autonomously guided forklift according to an exemplary embodiment of the present disclosure.

FIG. 7 illustrates a flowchart of a control method of an autonomously guided forklift according to an exemplary embodiment of the present disclosure.

Referring to FIG. 7, a target pallet 600 in front of the autonomously guided forklift in a traveling state is searched by using the laser sensor 135 (S300). In addition, the movement of the vehicle body 105 is controlled in approaching the target pallet 600 (S310).

The angle (θ) between the pallet center line 635 passing through the center of the pallet 600 and the vehicle body center line 640 of the forklift is detected (S320). In addition, the movement of the vehicle body 105 is controlled and if need be corrected so that the angle (θ) may be included within a predetermined set value (S330).

The vehicle body 105 is brought closer to the pallet 600 (S340). The angle (θ') between the pallet front surface line 615 shown along the front surface of the pallet 600 and the fork front end line 605 connecting the front end of the fork 120 of the forklift is detected (S350). In addition, the movement of the vehicle body 105 is controlled and if need be corrected so that the angle (θ') may be included within a predetermined set value (S360).

The laser sensor 135 measures a distance 630 between the fork insertion holes 620 formed in the pallet 600 (S370). In addition, the control unit 500 adjusts an interval of the forks 120 of the forklift (distance between the forks in the drawing) (S380).

The control unit 500 moves the vehicle body 105 to perform docking so that each fork 120 is inserted into a fork insertion hole 620 of the pallet 600 (S390).

In the exemplary embodiment of the present disclosure, while the docking is performed at step S390, as described in FIG. 4, the docking retry logic may be performed. In this case, the sensor unit 130 provided at the front end of the fork 120 operates. As shown in FIG. 4, the control unit 500 may control the movement of the vehicle body 105 of the forklift according to the detected signal.

According to the exemplary embodiment of the present disclosure, when a front object is detected by the non-contact sensor of the fork sensor unit 130, it is possible to improve docking accuracy between the pallet and the fork by moving the vehicle backward. In addition, by rotating the vehicle body in a right direction when a signal from the left contact sensor is detected and by rotating the vehicle body in a left direction when a signal from the right contact sensor is detected, it is possible to easily insert the fork into the center of the insertion hole of the pallet, thereby improving docking accuracy. Further, by using the contact sensor and the non-contact sensor, it is possible to allow the fork to effectively detect an obstacle, thereby improving the docking accuracy between the fork and the pallet.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

The invention claimed is:

1. A control method of a forklift, the forklift having two forks, the method comprising:

detecting a shape of and a distance to a target pallet by using a laser sensor;

approaching a vehicle body to the pallet;

detecting an angle (θ) between a pallet center line of the pallet and a vehicle body center line of the vehicle body;

controlling a position of the vehicle body so that the angle (θ) is within a predetermined numerical value;

detecting a signal generated by a sensor unit provided at a front end of the fork of the forklift; and controlling movement of the forklift by using the signal;

wherein when a non-contact sensor provided at the sensor unit generates a signal upon detecting an external object, the vehicle body is moved backward; and when a contact sensor provided at the sensor unit generates a signal upon contacting a front object to detect an external object, the vehicle body is rotated rightward or leftward by a predetermined angle.

2. The control method of the forklift of claim 1, further comprising:

detecting an angle (θ') between a front surface line of the pallet and a front end line of the fork; and controlling a position of the vehicle body so that the angle (θ') is within a predetermined numerical value.

3. The control method of the forklift of claim 1, further comprising:

measuring a distance between fork insertion holes formed in the pallet by using the laser sensor; and adjusting a distance between the forks according to the distance between the fork insertion holes.

4. The control method of the forklift of claim 2, further comprising:

moving the vehicle body so that the forks are inserted into the fork insertion holes formed in the pallet.

* * * * *